(12) United States Patent
Setescak

(10) Patent No.: US 8,950,272 B2
(45) Date of Patent: Feb. 10, 2015

(54) AIR MASS FLOWMETER

(75) Inventor: Stephen Setescak, Pentling (DE)

(73) Assignee: Continental Automotive GmbH, Hannover (DE)

( * ) Notice: Subject to any disclaimer, the term of this patent is extended or adjusted under 35 U.S.C. 154(b) by 214 days.

(21) Appl. No.: 13/641,439

(22) PCT Filed: Apr. 12, 2011

(86) PCT No.: PCT/EP2011/055656
§ 371 (c)(1),
(2), (4) Date: Oct. 15, 2012

(87) PCT Pub. No.: WO2011/128310
PCT Pub. Date: Oct. 20, 2011

(65) Prior Publication Data
US 2013/0025353 A1   Jan. 31, 2013

(30) Foreign Application Priority Data
Apr. 16, 2010  (DE) .......................... 10 2010 015 523

(51) Int. Cl.
*G01F 1/86* (2006.01)
*G01F 1/684* (2006.01)
*G01F 15/00* (2006.01)

(52) U.S. Cl.
CPC ............ *G01F 1/6842* (2013.01); *G01F 15/00* (2013.01)
USPC ..................................................... 73/861.01

(58) Field of Classification Search
USPC .................. 73/204.25, 202.5, 114.34, 861.22
See application file for complete search history.

(56) References Cited

U.S. PATENT DOCUMENTS

| 5,546,794 | A * | 8/1996 | Kuhn et al. ............... 73/114.34 |
| 6,018,994 | A | 2/2000 | Yonezawa et al. |
| 6,185,998 | B1 | 2/2001 | Yonezawa et al. |
| 6,701,781 | B1 | 3/2004 | Lutowsky, Jr. et al. |
| 7,269,999 | B2 | 9/2007 | Nakano et al. |
| 2007/0125167 | A1 | 6/2007 | Kitahara |

FOREIGN PATENT DOCUMENTS

| CN | 1806159 | 7/2006 |
| DE | 43 40 882 | 6/1995 |
| DE | 43 40 882 A1 | 6/1995 |
| DE | 197 50 594 A1 | 10/1998 |
| DE | 197 48 853 A1 | 12/1998 |
| DE | 101 54 561 | 5/2002 |
| DE | 101 54 561 A1 | 5/2002 |
| DE | 101 45 195 | 4/2003 |
| DE | 101 45 195 A1 | 4/2003 |
| DE | 103 37 824 A1 | 3/2005 |

(Continued)

*Primary Examiner* — Jewel V Thompson
(74) *Attorney, Agent, or Firm* — Cozen O'Connor

(57) ABSTRACT

An air mass flowmeter having a sensor module fitted in a tube for measuring a gas quantity flowing in the tube at a flow speed. The sensor module extends in the tube. A start of the sensor module defines a first plane and an end of the sensor module defines a second plane both normal to the direction of flow. Extended flow directing elements are arranged in the tube parallel to the direction of flow so that the gas flows onto end faces and wall regions of the flow elements. The wall regions extend between the first and second planes and increase the flow speed of the gas given a low flow speed, relative to the flow speed in the tube, and increase the flow speed of the gas to a lesser extent, given a high flow speed of the gas relative to the flow speed.

6 Claims, 5 Drawing Sheets

(56) References Cited

FOREIGN PATENT DOCUMENTS

| | | |
|---|---|---|
| DE | 10 2004 028 214 A1 | 12/2005 |
| DE | 10 2007 026 673 A1 | 12/2008 |
| EP | 0 458 998 | 12/1991 |
| EP | 0 458 998 A1 | 12/1991 |
| JP | 07-198440 | 8/1995 |
| JP | 2007-155435 | 6/2007 |

* cited by examiner

AIR MASS FLOWMETER

CROSS REFERENCE TO RELATED APPLICATIONS

This is a U.S. national stage of application No. PCT/EP2011/055656, filed on 12 Apr. 2011. Priority is claimed on German Application No. 10 2010 015 523.3 filed 16 Apr. 2010, the content of which is incorporated here by reference.

BACKGROUND OF THE INVENTION

1. Field of the Invention

The invention relates to an air mass flowmeter comprising a tube and a sensor module, which is fitted in the tube, for measuring a gas quantity flowing in a main direction of flow in the tube at a flow speed. The sensor module extends in the main direction of flow in the tube, a first end of the sensor module defines a first plane normal to the main direction of flow and a second end of the sensor module defines a second plane normal to the main direction of flow. The sensor module has a flow channel that receives some of the gas quantity flowing in the tube and directs said gas quantity via measuring elements.

In the context of the present application, the term "air" is used as an example for a gas or gas mixture, the mass flow of which can be determined. In principle, the air mass flowmeter according to embodiments of the invention can be used to determine the mass flow of any gas or gas mixture.

2. Description of Prior Art

Air mass flowmeters of this kind are known and are used in large numbers in motor vehicle construction to detect the air mass flowing to an internal combustion engine. Depending on the air mass flow detected by the air mass flowmeter, it is possible both to perform diagnostics, e.g. of the operation of the internal combustion engine, and to exercise control of the internal combustion engine. For these purposes, detection of the actual air mass flow in a manner which is reliable and as precise as possible, even under different operating conditions, is important.

EP 0 458 998 A1 discloses an air mass flowmeter having a housing in which a flow channel is formed and in which a flow straightener is inserted upstream of a sensor element. The flow straightener comprises a honeycomb body and a ring, which protrudes beyond the combs in the flow direction and in which a grill is embedded at a distance from the combs, producing microvortices. The grill has the disadvantage that, with prolonged operation of the air mass flowmeter under high vibrational loads, of the kind which often occur in the automotive engineering sector, it is subject to fatigue and may fail mechanically. Moreover, the insertion of the grill into the ring of the honeycomb body is complex and therefore expensive.

SUMMARY OF THE INVENTION

It is an object of one embodiment of the present invention to specify an air mass flowmeter that can be produced at low cost and allows accurate measurement of an air mass flow.

Extended flow directing elements are arranged in the tube and are oriented parallel to the main direction of flow, resulting in the gas quantity flowing against end faces of the flow directing elements and flowing past wall regions of the flow elements. The wall regions of the flow directing elements extend at least partially between the first and second planes, with the result that, given a low flow speed in the tube, the flow directing elements increase the flow speed of the gas quantity in the region of the sensor module, relative to the flow speed in the tube, and, given a high flow speed of the gas quantity in the tube, increase the flow speed of the gas quantity to a lesser extent in the region of the sensor module, relative to the flow speed, very accurate measurement of the air mass flow in the tube is obtained.

In a refinement, the flow directing elements are of aerodynamic design, suppressing disturbance of the air flow by turbulence and ensuring precise measurement. Design of the flow directing elements in a droplet or wing shape also provides these advantages.

In another refinement of the invention, the flow directing elements reduce the tube cross section by 10-50%. This leads to a pressure increase at the sensor module, enabling measurement of the air mass flow to be carried out in a very stable and accurate manner.

In one embodiment, the tube and the flow directing elements are designed as an integral component. This leads to a very low-cost and robust air mass flowmeter with a long life.

BRIEF DESCRIPTION OF THE DRAWINGS

The invention is explained in greater detail below with reference to FIGS. 1 to 6A and 6B.

FIG. 3b is an air outlet side of the air mass flowmeter of FIG. 3a;

FIG. 4b is an air outlet side of the air mass flowmeter of FIG. 4a;

FIG. 5b is an air outlet side of the air mass flowmeter of FIG. 5a;

FIG. 6b is an air outlet side of the air mass flowmeter of FIG. 6a.

DETAILED DESCRIPTION OF THE PREFERRED EMBODIMENTS

Figure 1:
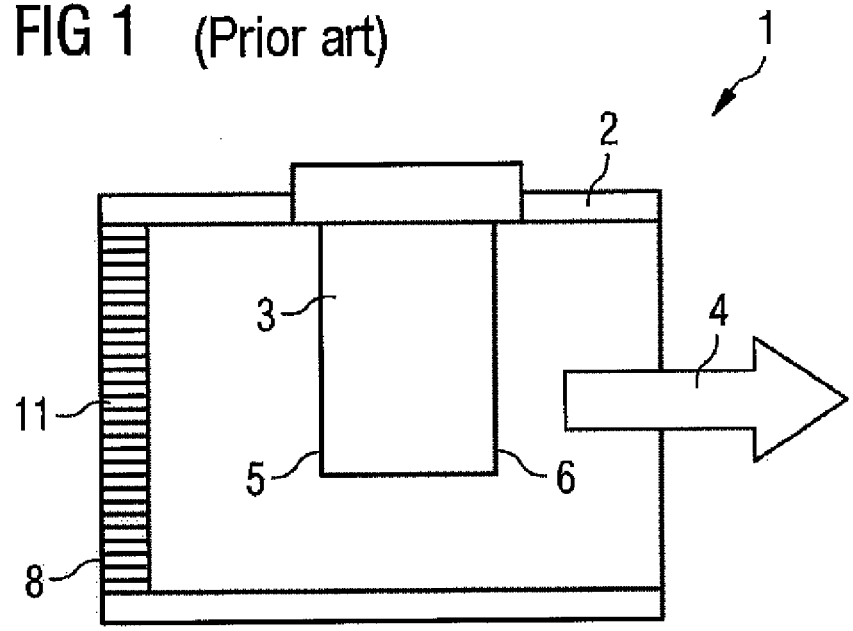
FIG. 1 is an air mass flowmeter in accordance with the prior art.

FIG. 1 is a prior art air mass flowmeter 1. The air mass flowmeter 1 comprises a tube 2 and a sensor module 3. The sensor module 3 has a start 5 and an end 6 in relation to a main direction of flow of the air mass in the tube 2. To perform measurement without error at all flow speeds of the air mass in the tube 2, a flow directing element 8 is formed ahead of the sensor module 3, at a certain distance from the start 5 of the sensor module 3. This prior-art flow directing element 8 is a grill 11.

Figure 2:
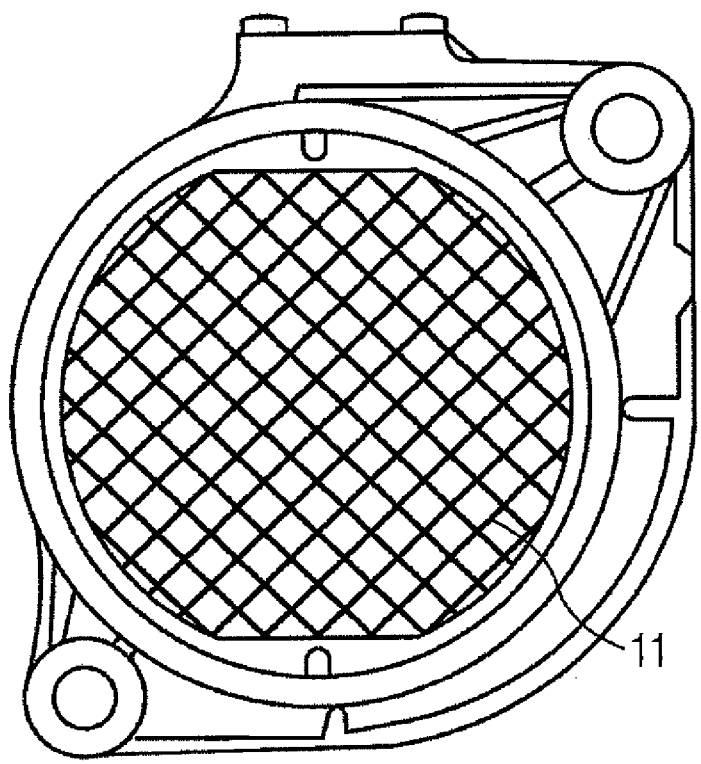
FIG. 2 is a grill in accordance with the prior art.

In FIG. 2, the grill 11 is shown in a front view.

The air mass sensors according to the invention, which are illustrated in FIGS. 3 to 6, dispense completely with the flow directing element 8 configured as grill 11.

Figure 3A:
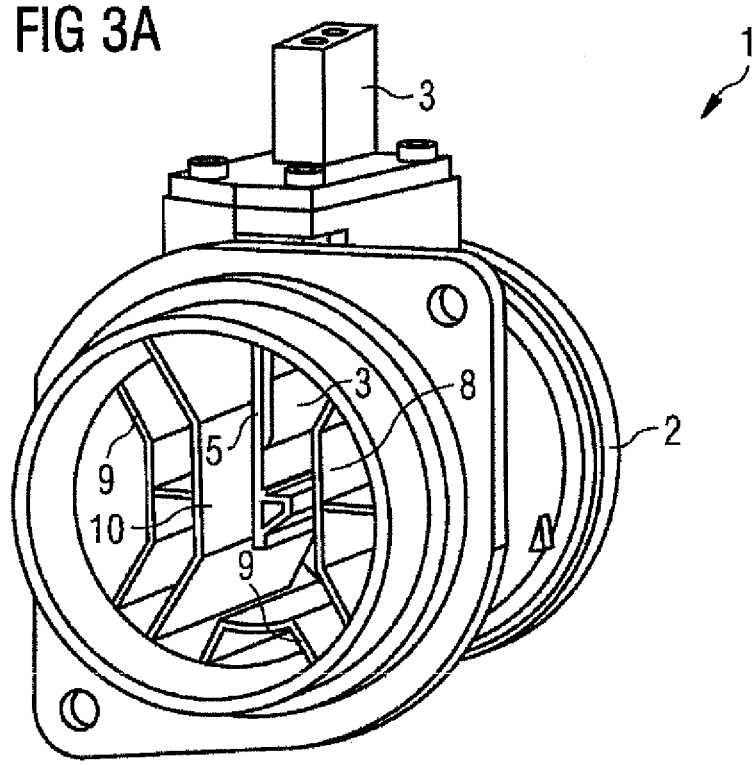
FIG. 3a is an air inlet side of an air mass flowmeter according to the invention.

FIG. 3a shows the air inlet side of an air mass flowmeter 1 according to one embodiment of the invention showing tube 2, in which the sensor module 3 is positioned. The sensor module 3 is designed to measure the gas quantity flowing in the main direction of flow 4 in the tube 2 at a flow speed.

The sensor module 3 extends in the main direction of flow 4 in the tube. A start 5 can be seen on the sensor module 3 that defines a first plane normal to the main direction of flow 4.

Figure 3B:
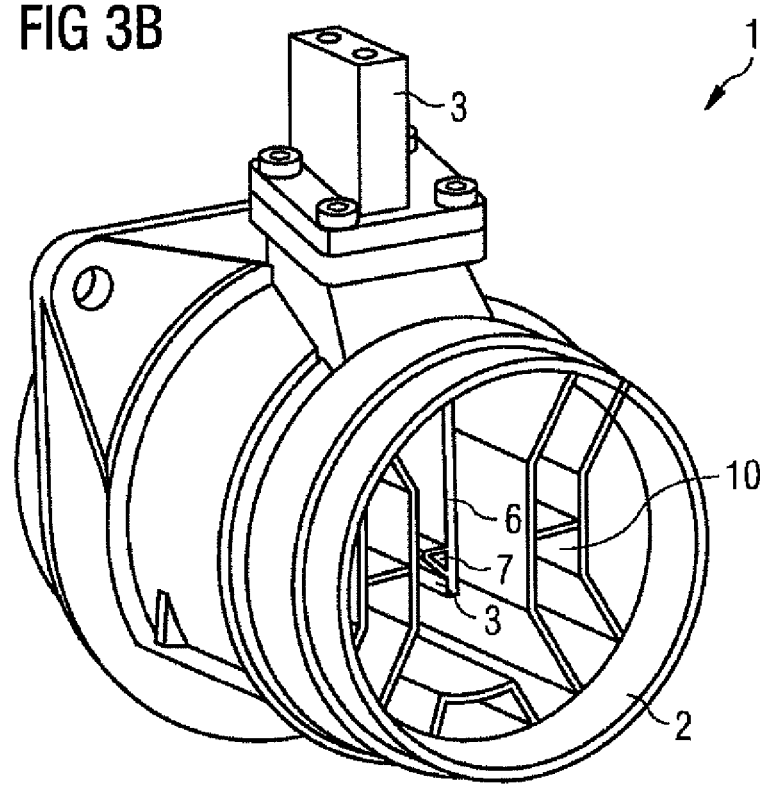

A second plane normal to the main direction of flow 4 is shown on the air outlet side of the air mass flowmeter 1 in FIG. 3b at end 6. The sensor module 3 has a flow channel 7, which receives some of the gas quantity flowing in the tube 2 and directs said gas quantity via a measuring element. Extended flow directing elements 8 are arranged in the tube 2 of the air mass flowmeter 1 and are oriented parallel to the main direction of flow 4. The gas quantity flows against an edge end face 9 of the flow directing elements 8, after which the gas quantity flows past the wall regions 10 of the flow directing elements 8. The end faces 9 of the flow directing elements 8 reduce the cross section of the tube 2. As a result of the reduced cross section, the pressure in the region of the sensor module 3 increases, and the flow speed of the gas quantity is raised. The wall regions 10 of the flow directing elements 8, past which the gas quantity flows, lie opposite the latter. Depending on the prevailing flow speed, a laminar flow or a turbulent flow of the gas quantity will form at said wall regions 10. The wall regions 10 of the flow directing elements extend at least partially between the first and second planes, with the result that, given a low flow speed in the tube, the flow directing elements increase the flow speed of the gas quantity in the region of the sensor module 3, relative to the flow speed in the tube 2. Given a high flow speed of the gas quantity in the tube 2, however, the flow speed is increased to a lesser extent in the region of the sensor module 3, this being attributable to the onset of turbulent flow in the wall region 10 of the flow directing elements 8 at a high flow speed. Given a low flow speed, there is a laminar flow of the gas quantity at the wall regions 10 of the flow directing elements 8, with the result that, given a low flow speed in the tube 2, the flow speed of the gas quantity is increased in the region of the sensor module 3, relative to the flow speed in the tube.

FIG. 3b shows the air outlet side of the air mass flowmeter 1 shown in FIG. 3a. Once again, it is possible to see the tube 2 with the sensor module 3. The sensor module 3 now shows its end 6 in relation to the main direction of flow 4. The end 6 of the sensor module 3 forms the second plane normal to the main direction of flow 4. Moreover, the flow directing elements 8 with the wall regions 10 thereof can be seen.

In FIGS. 3a and 3b, the flow directing elements 8 are designed as pedestal-like bodies. The flow directing elements 8 can be formed integrally with the tube 2 and can be produced by injection molding.

Figure 4A:
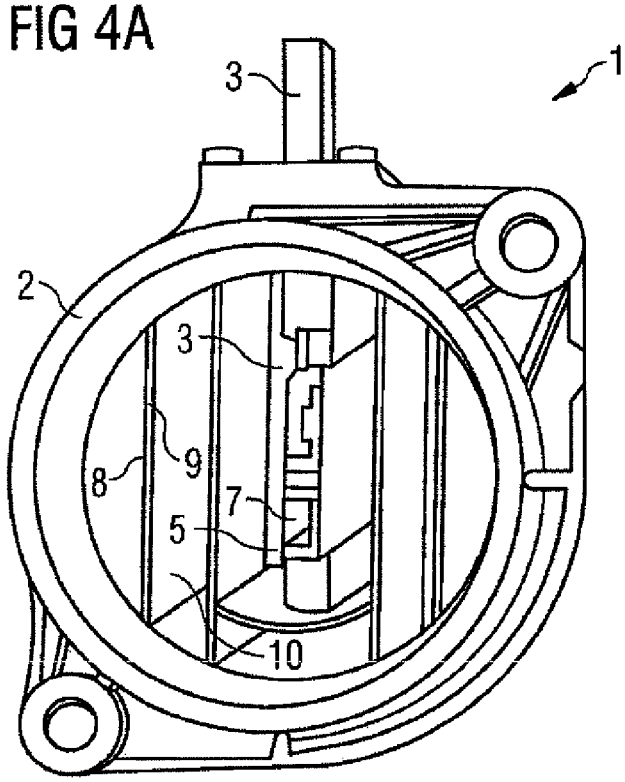
FIG. 4a is an air mass flowmeter according to the invention, looking toward the air inlet side.

FIG. 4a shows the air inlet side of an air mass flowmeter 1 according to one embodiment of the invention. The sensor module 3 is once again visible in the tube 2. The sensor module 3 shows its start 5 in relation to the main direction of flow 4. The start of the flow channel 7 can furthermore be seen on the sensor module 3. The flow directing elements 8 are designed as parallel webs in the tube 2. The end faces 9 of the flow directing elements 8 can be seen, and the wall regions 10 of the flow directing elements 8 are illustrated.

Figure 4B:
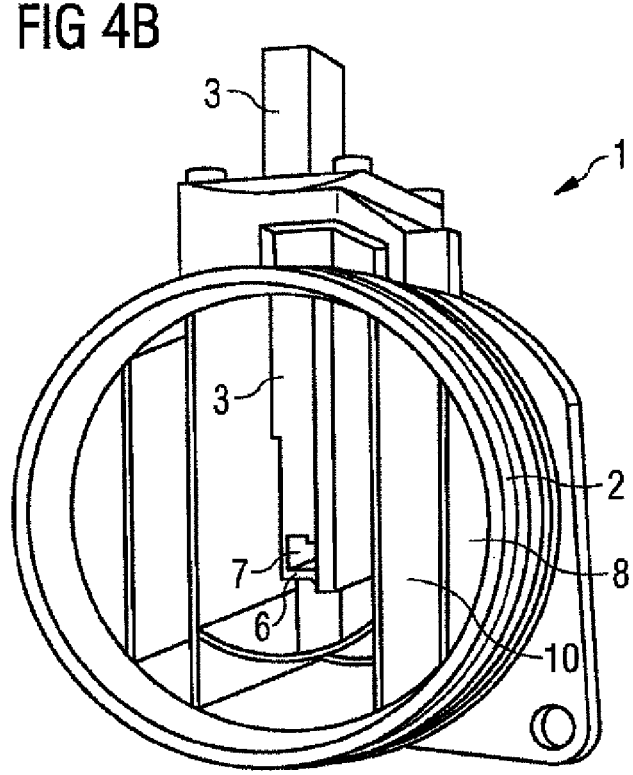

FIG. 4b shows the air outlet side of the air mass flowmeter 1 illustrated in FIG. 4a. The sensor module 3 now shows its end 6 in relation to the main direction of flow 4. The shape of the flow directing elements 8 is once again visible.

Figure 5A:
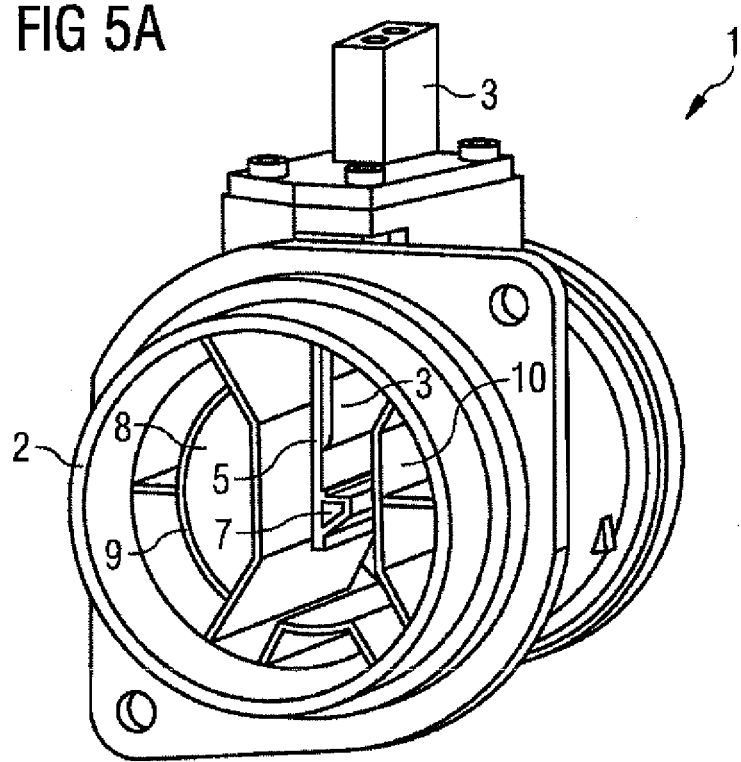
FIG. 5a is an air mass flowmeter according to the invention, looking toward the air inlet side.

An air mass flowmeter 1 according to one embodiment of the invention is also illustrated in FIG. 5a. The sensor module 3 is once again visible in the tube 2, showing its start 5 in relation to the main direction of flow 4. The flow channel 7 is formed on the sensor module 3. The flow directing elements 8 are now designed in part as a concentric, partially interrupted circle in the tube 2 and are combined with flow directing elements 8 which are formed in a pedestal-like manner parallel to the sensor module 3.

Figure 5B:
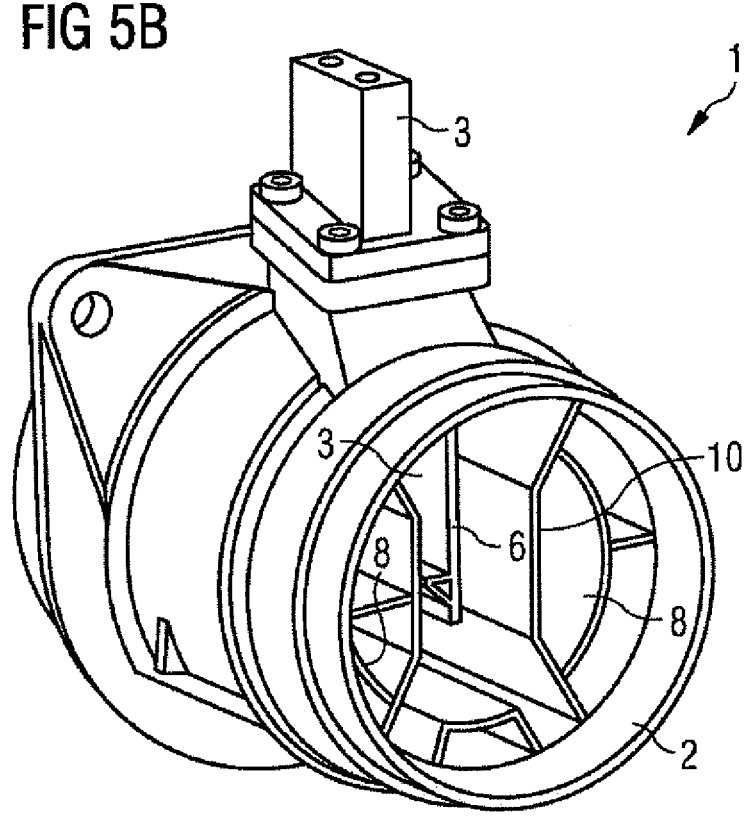

FIG. 5b shows the air outlet side of the air mass flowmeter 1 illustrated in FIG. 5a. Here too, the shape of the flow directing elements 8 can be seen. An interrupted circle concentric with respect to the tube 2 forms part of the flow directing element 8. Combined therewith, there are two pedestal-like flow directing elements arranged parallel to the sensor module 3.

Figure 6A:
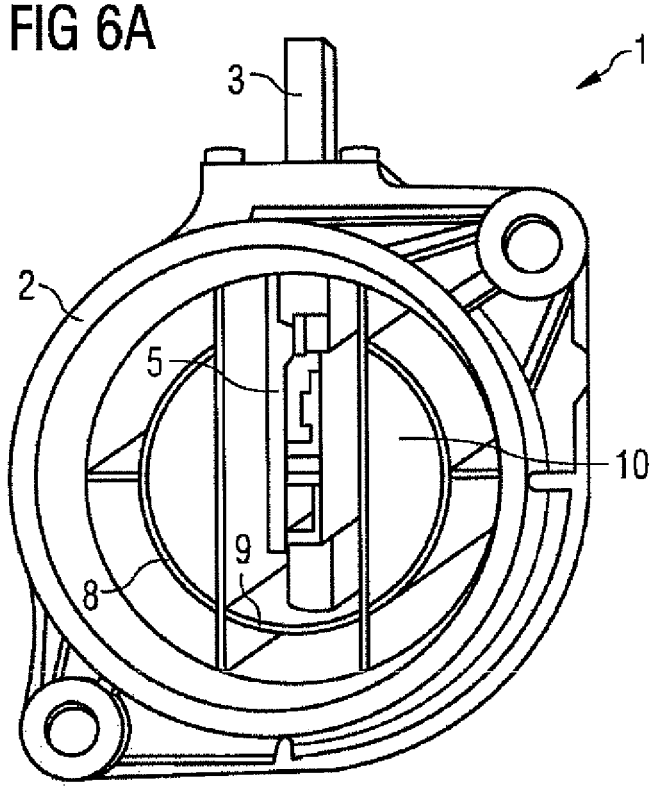
FIG. 6a is an air mass flowmeter according to the invention, looking toward the air inlet side.

Another embodiment of the air mass flowmeter 1 is illustrated in FIG. 6a. The sensor module 3 is once again arranged in the tube 2. Two webs, which form the flow directing elements 8, are situated parallel to the sensor module 3. These webs are supplemented by a circle concentric with the tube, which forms another flow directing element 8.

Figure 6B:
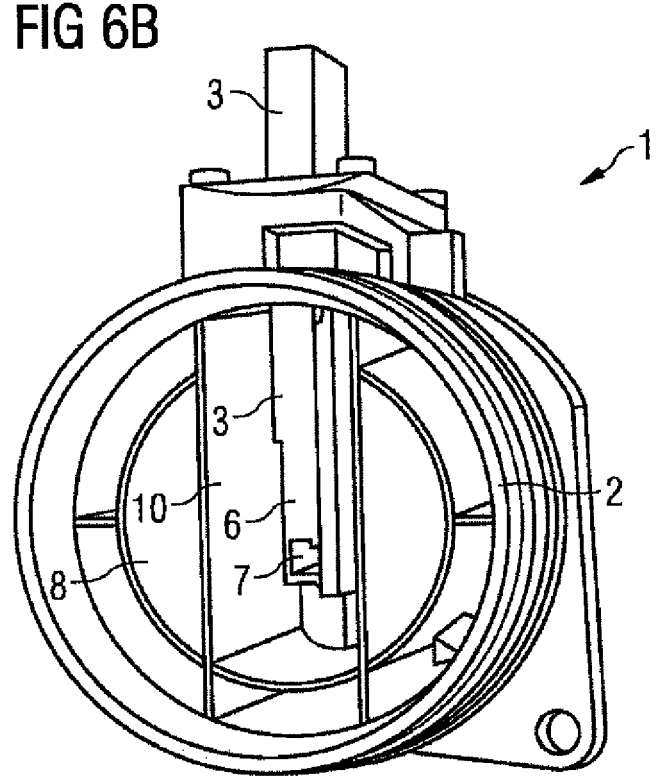

FIG. 6b shows the air outlet side of the air mass flowmeter shown in FIG. 6a. Here too, the shape of the flow directing elements 8 is illustrated. In each embodiment of the air mass flowmeter 1 according to the invention, the flow directing elements 8 can be produced as an integral component with the tube 2, e.g. by injection molding.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:
1. An air mass flowmeter comprising:
a tube;
a sensor module fitted in the tube that measures a gas quantity flowing in a main direction of flow in the tube at a flow speed, the sensor module extending in the main direction of flow in the tube;
a first end of the sensor module defines a first plane normal to the main direction of flow;
a second end of the sensor module defines a second plane normal to the main direction of flow;
a flow channel in the sensor module that receives a portion of the gas quantity flowing in the tube and directs the portion of the gas quantity via measuring elements;
extended flow directing elements arranged in the tube that are oriented parallel to the main direction of flow, wherein the gas quantity flows against end faces of the extended flow directing elements and flows past wall regions of the extended flow directing elements, wherein the extended flow directing elements include:
a plurality of first elements each extending from an upper surface of the tube to a lower surface of the tube and each being arranged parallel to the sensor module, and
at least one second element having a shape of a partially interrupted circle concentric to the tube, wherein the wall regions of the extended flow directing elements extend at least partially between the first and second planes, whereby, given a low flow speed in the tube, the extended flow directing elements increase the flow speed of the gas quantity in a region of the sensor module, relative to the flow speed in the tube, and, given a high flow speed of the gas quantity in the tube, increase the flow speed of the gas quantity to a lesser extent in the region of the sensor module, relative to the flow speed.

2. The air mass flowmeter as claimed in claim 1, wherein the extended flow directing elements are of aerodynamic design.

3. The air mass flowmeter as claimed in claim 2, wherein the extended flow directing elements include elements that are droplet shaped.

4. The air mass flowmeter as claimed in claim 2, wherein the extended flow directing elements include elements that are wing-shaped.

5. The air mass flowmeter as claimed in claim 1, wherein the extended flow directing elements reduce a tube cross section by 10-50%.

6. The air mass flowmeter as claimed in claim 1, wherein the tube and the extended flow directing elements are an integral component.

* * * * *